(12) United States Patent
Yoshida et al.

(10) Patent No.: US 12,065,902 B2
(45) Date of Patent: Aug. 20, 2024

(54) FRAC PLUG AND METHOD FOR MANUFACTURING SAME, AND METHOD FOR SEALING BOREHOLE

(71) Applicant: Kureha Corporation, Tokyo (JP)

(72) Inventors: Shinnosuke Yoshida, Tokyo (JP); Shinya Takahashi, Tokyo (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 17/997,784

(22) PCT Filed: May 7, 2021

(86) PCT No.: PCT/JP2021/017529
§ 371 (c)(1),
(2) Date: Nov. 2, 2022

(87) PCT Pub. No.: WO2021/225164
PCT Pub. Date: Nov. 11, 2021

(65) Prior Publication Data
US 2023/0193109 A1      Jun. 22, 2023

(30) Foreign Application Priority Data

May 7, 2020    (JP) ................................. 2020-081791
Dec. 28, 2020  (JP) ................................. 2020-219260

(51) Int. Cl.
*E21B 33/129*       (2006.01)
*B21C 23/14*        (2006.01)
(Continued)

(52) U.S. Cl.
CPC .......... *E21B 33/1293* (2013.01); *B21C 23/14* (2013.01); *C22C 23/00* (2013.01);
(Continued)

(58) Field of Classification Search
CPC . E21B 33/1208; E21B 33/1293; B21C 23/14; C09K 8/426; C09K 8/46;
(Continued)

(56) References Cited

U.S. PATENT DOCUMENTS 10,337,086 B2     7/2019  Wilks et al.
10,689,740 B2 *   6/2020  Doud ........................ C22C 1/02
(Continued)

FOREIGN PATENT DOCUMENTS

CN      106868368 A    6/2017
CN      107699763 A    2/2018
(Continued)

OTHER PUBLICATIONS

Office Action for CN202180027096.9, mailed Sep. 29, 2023, 3 pages.
(Continued)

*Primary Examiner* — Daniel P Stephenson
(74) *Attorney, Agent, or Firm* — Abel Schillinger, LLP

(57) ABSTRACT

Provided is a frac plug or the like capable of being inserted into a borehole to seal the borehole with high strength, and then quickly disassembled and removed, thereby efficiently producing petroleum. A frac plug according to the present embodiment has a member made of a magnesium (Mg) alloy. The member has a multi-phase structure including a first phase, which is a matrix phase, and a second phase present in the first phase. In the multi-phase structure, the second phase is distributed in a substantially striped pattern in the first phase in a first cross section perpendicular to a second direction of the frac plug, and distributed in a substantially mesh-like pattern in the first phase in a second cross section perpendicular to a first direction of the frac plug.

12 Claims, 3 Drawing Sheets

(51) Int. Cl.
*C22C 23/00* (2006.01)
*C22C 23/04* (2006.01)
*C22C 23/06* (2006.01)
*E21B 33/12* (2006.01)
*C09K 8/42* (2006.01)
*C09K 8/46* (2006.01)

(52) U.S. Cl.
CPC .............. *C22C 23/04* (2013.01); *C22C 23/06* (2013.01); *E21B 33/1208* (2013.01); *C09K 8/426* (2013.01); *C09K 8/46* (2013.01)

(58) Field of Classification Search
CPC ......... C22C 23/00; C22C 23/04; C22C 23/06; C22F 1/06
See application file for complete search history.

(56) References Cited

U.S. PATENT DOCUMENTS

| | | | |
|---|---|---|---|
| 10,738,561 | B2 | 8/2020 | Kobayashi et al. |
| 11,167,343 | B2 | 11/2021 | Wolf et al. |
| 2011/0136707 | A1* | 6/2011 | Xu .................. C22C 32/00 507/272 |
| 2014/0027128 | A1* | 1/2014 | Johnson .......... C22C 1/0408 166/376 |
| 2016/0024619 | A1 | 1/2016 | Wilks et al. |
| 2018/0230769 | A1 | 8/2018 | Xu et al. |
| 2018/0306027 | A1* | 10/2018 | Sherman .............. G01N 33/24 |
| 2019/0017346 | A1 | 1/2019 | Kobayashi et al. |
| 2019/0032173 | A1 | 1/2019 | Sherman et al. |
| 2019/0054523 | A1 | 2/2019 | Wolf et al. |
| 2019/0264520 | A1* | 8/2019 | Frazier .............. E21B 33/134 |
| 2021/0040593 | A1 | 2/2021 | Wang et al. |
| 2021/0238449 | A1 | 8/2021 | Myles et al. |
| 2021/0254195 | A1* | 8/2021 | Xu ...................... C22C 21/06 |
| 2023/0193109 | A1* | 6/2023 | Yoshida ............... C09K 8/46 166/387 |

FOREIGN PATENT DOCUMENTS

| | | | |
|---|---|---|---|
| CN | 107956462 A | * 4/2018 | ............... C23F 1/16 |
| CN | 108368572 A | 8/2018 | |
| CN | 108385007 A | 8/2018 | |
| CN | 109295368 A | 2/2019 | |
| EP | 3395972 A1 | 10/2018 | |
| JP | 52-119409 A | 10/1977 | |
| JP | 2008106337 A | 5/2008 | |
| JP | 2014-152361 A | 8/2014 | |
| JP | 2016169427 A | 9/2016 | |
| JP | 2017-525843 A | 9/2017 | |
| JP | 2019531368 A | 10/2019 | |
| WO | 2016025275 A1 | 2/2016 | |
| WO | 2016032761 A1 | 3/2016 | |
| WO | 2017053332 A1 | 3/2017 | |
| WO | 2017/111159 A1 | 6/2017 | |

OTHER PUBLICATIONS

English translation of Office Action for CN202180027096.9, mailed Sep. 29, 2023, 5 pages.
Office Action for CN Application No. 202180027096.9, dated May 7, 2023, 9 pages.
English translation of Office Action for CN Application No. 202180027096.9, dated May 7, 2023, 14 pages.
Office Action for CA3174268, mailed Feb. 1, 2024, 3 pages.
Extended European Search Report issued in the EP Patent Application No. 21800965.2, mailed on Mar. 14, 2024, 9 pages.

* cited by examiner (a)

(b)

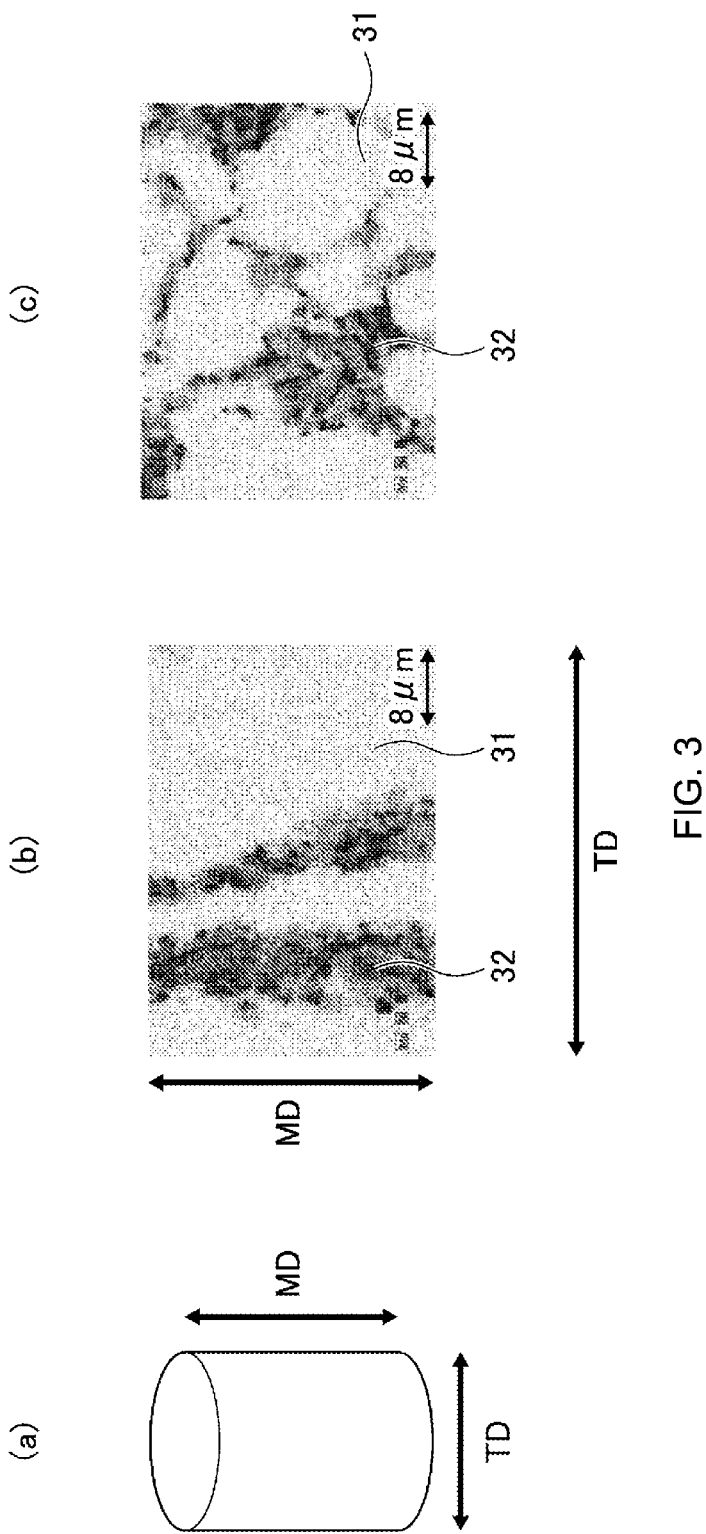

FRAC PLUG AND METHOD FOR MANUFACTURING SAME, AND METHOD FOR SEALING BOREHOLE

TECHNICAL FIELD

The present invention relates to a frac plug and a method for manufacturing the same, and a method for sealing a well.

BACKGROUND ART

Various tools called downhole tools have been developed for excavating petroleum such as shale oil or natural gas such as shale gas (hereinafter, which may be simply referred to as "petroleum or the like"). As one type of these downhole tools, a frac plug used in hydraulic fracturing is known. In the hydraulic fracturing, the frac plug is fed to a predetermined position of the well, then actuated, and fixed to a well wall to seal the wellbore. Thereafter, water is pumped from the ground into the well, and a water pressure is applied to a section on the ground side with respect to the frac plug fixed to the well wall, to thereby generate cracks in a stratum through a perforation formed using an explosive or the like and stimulate a production reservoir, and the petroleum or the like is recovered and produced. Stimulation of the production reservoir is sometimes repeated again in wellbores that have already been formed, in addition to drilling of new wells.

It is necessary to remove the frac plug and release the sealing of the wellbore, because of the recovery of the petroleum or the like after the formation of cracks in the stratum. Known frac plugs are broken/disintegrated and fragmentated into small pieces by crushing, drilling out, or another method, and thus the sealing is released and the frac plugs are removed from the well. The crushing, drilling, or the like for the removal spends much expense and time, and is very inefficient. In addition, there are frac plugs designed to be able to be recovered after use. However, the plugs are used in deep underground, and thus involve a problem that much expense and time are required also to recover all of them.

For example, there is disclosed (e.g., Patent Document 1) a method of using a thermally degradable adhesive in which a portion of a downhole device is adhered to a thermally degradable composition, followed by heating to a temperature sufficient to degrade the thermally degradable composition. However, the frac plug member can be separated by thermal degradation of the adhesive, but cannot be broken or fragmentated into small pieces. Thus, there remains a problem that the frac plug member must be separately broken/disintegrated and fragmentated into small pieces before being excluded.

Also known is a downhole tool formed of a corrosive material that is corrosive in downhole environments in order that it is removed by dissolution or disintegration after use, and a magnesium alloy containing zinc, nickel, gadolinium, yttrium, or zirconium as an additive element is disclosed as such a corrosive material (e.g., Patent Document 2). However, since its corrosiveness and degradability are not high, it is insufficient for improving the efficiency of well treatment, and involves a problem that it cannot cope with various well environments.

CITATION LIST

Patent Document

Patent Document 1: JP 2017-525843 T
Patent Document 2: US 2019/0054523 A

SUMMARY OF INVENTION

Technical Problem

An object of the present invention is to provide a frac plug which is inserted into a wellbore, then seals the wellbore at a high strength, and is then rapidly degraded and removed, and enables efficient production of petroleum or the like, and a method for manufacturing the same, and a method for sealing a well.

Solution to Problem

The present inventors have completed a frac plug having a member formed of a magnesium (Mg) alloy having both high strength and excellent degradability. The gist of the present invention is as follows.

(1) A frac plug including a member made of an Mg alloy, wherein the member has a dual phase structure that includes: a first phase, which is a base phase; and a second phase present in the first phase, and in the dual phase structure, the second phase is distributed in a substantially stripe shape in the first phase in a first cross section orthogonal to a second direction of the frac plug, and is distributed in a substantially net shape in the first phase in a second cross section orthogonal to a first direction of the frac plug.

(2) The frac plug according to (1), wherein the Mg alloy has a component composition containing Ni: from 1.0 to 8.0 mass %, Gd: from 1.0 to 8.0 mass %, Y: from 0.1 to 1.5 mass %, Cu: from 0.1 to 1.5 mass %, and Zn: from 0.1 to 1.5 mass %, the balance being composed of Mg and unavoidable impurities.

(3) The frac plug according to (1) or (2), wherein the first phase contains one or both of Mg and Gd, and the second phase contains one or both of Y and one or more components of Ni, Cu, and Zn.

(4) The frac plug according to any one of (1) to (3), wherein the Mg alloy further contains at least one component selected from the group of Co: from 0.01 to 0.3 mass %, Fe: from 0.01 to 0.3 mass %, and Ca: from 0.01 to 0.3 mass %.

(5) The frac plug according to any one of (1) to (4), wherein the member produces a degradation product in a 2.0 mass % KCl aqueous solution at 200° F. (93.3° C.), and a volume of the degradation product is 2.5 times or less relative to a volume of the member before degradation.

(6) The frac plug according to any one of (1) to (5), wherein the member has an average thickness decrease rate of 0.8 mm/hr or greater and 10 mm/hr or less in a 0.05 mass % KCl aqueous solution at 250° F. (121.0° C.).

(7) The frac plug according to any one of (1) to (6), wherein the member has a ratio of an average thickness decrease rate in the 2.0 mass % KCl aqueous solution to the average thickness decrease rate in the 0.05 mass % KCl aqueous solution of 1 time or greater and 4 times or less, in a range from 100° F. (37.8° C.) to 150° F. (65.6° C.).

(8) The frac plug according to any one of (1) to (7), wherein the member has a thickness decrease rate in the second direction higher than a thickness decrease rate in the first direction in the 0.05 mass % KCl aqueous solution at 250° F. (121.0° C.).

(9) The frac plug according to any one of (1) to (8), wherein the frac plug has a substantially cylindrical shape, and the member is disposed in an orientation such that the first cross section is along the first direction of the frac plug and that the second cross section is along the second direction of the frac plug.

(10) The frac plug according to any one of (1) to (9), wherein the member is at least one member of a mandrel, a cone, a slip, or a bottom.

(11) The frac plug according to (10), wherein the member has a minimum thickness in a range from 1.5 to 45 mm.

(12) A method for manufacturing a frac plug including a member made of an Mg alloy,
the method including: extrusion-molding the Mg alloy; and cutting the extrusion-molded Mg alloy,
wherein the member constituting the frac plug has a dual phase structure including: a first phase, which is a base phase; and a second phase present in the first phase, and
in the dual phase structure, the second phase is distributed in a substantially stripe shape in the first phase in a first cross section orthogonal to a second direction of the frac plug, and is distributed in a substantially net shape in the first phase in a second cross section orthogonal to a first direction of the frac plug.

(13) A method for sealing a well by using a frac plug including a member made of an Mg alloy, the method including:
inserting the frac plug until the frac plug reaches a bottom of a well, installing the frac plug in the well, and completing sealing; and decreasing a thickness of a cross section of the member constituting the frac plug by a fluid existing in an environment of the well to release an installation state of the frac plug in the well,
wherein the member constituting the frac plug has a dual phase structure including: a first phase, which is a base phase; and a second phase present in the first phase, and
in the dual phase structure, the second phase is distributed in a substantially stripe shape in the first phase in a first cross section orthogonal to a second direction of the frac plug, and is distributed in a substantially net shape in the first phase in a second cross section orthogonal to a first direction of the frac plug.

Advantageous Effects of Invention

The present invention can provide a frac plug which is inserted into a wellbore, then seals the wellbore at a high strength, and is then rapidly degraded and removed, and enables efficient production of petroleum or the like, and a method for manufacturing the frac plug, and a method for sealing a well.

BRIEF DESCRIPTION OF THE DRAWINGS

FIG. 2 (a) illustrates a case where the Mg alloy is observed in a first cross section orthogonal to a second direction of the frac plug. and FIG. 2 (b) illustrates a case where the Mg alloy is observed in a second cross section orthogonal to the first direction of the frac plug.

FIG. 3(a) is a schematic view of a sample when prepared by cutting the Mg alloy used in the frac plug according to an embodiment of the present invention into a cylindrical shape. FIG. 3(b) is a mapping photograph when a side peripheral surface of the sample illustrated in FIG. 3(a), corresponding to the first cross section, is subjected to metallographic and elemental analysis using an SEM-EDS device. FIG. 3(c) is a mapping photograph when a bottom surface of the sample illustrated in FIG. 3(a), corresponding to the second cross section, is subjected to metallographic and elemental analysis using the SEM-EDS device.

DESCRIPTION OF EMBODIMENTS

Hereinafter, an embodiment of the present invention will be described. The present invention is not limited to the following embodiments and can be implemented with appropriate modifications within the scope of the object of the present invention.

(Configuration of Frac Plug)

Figure 1:
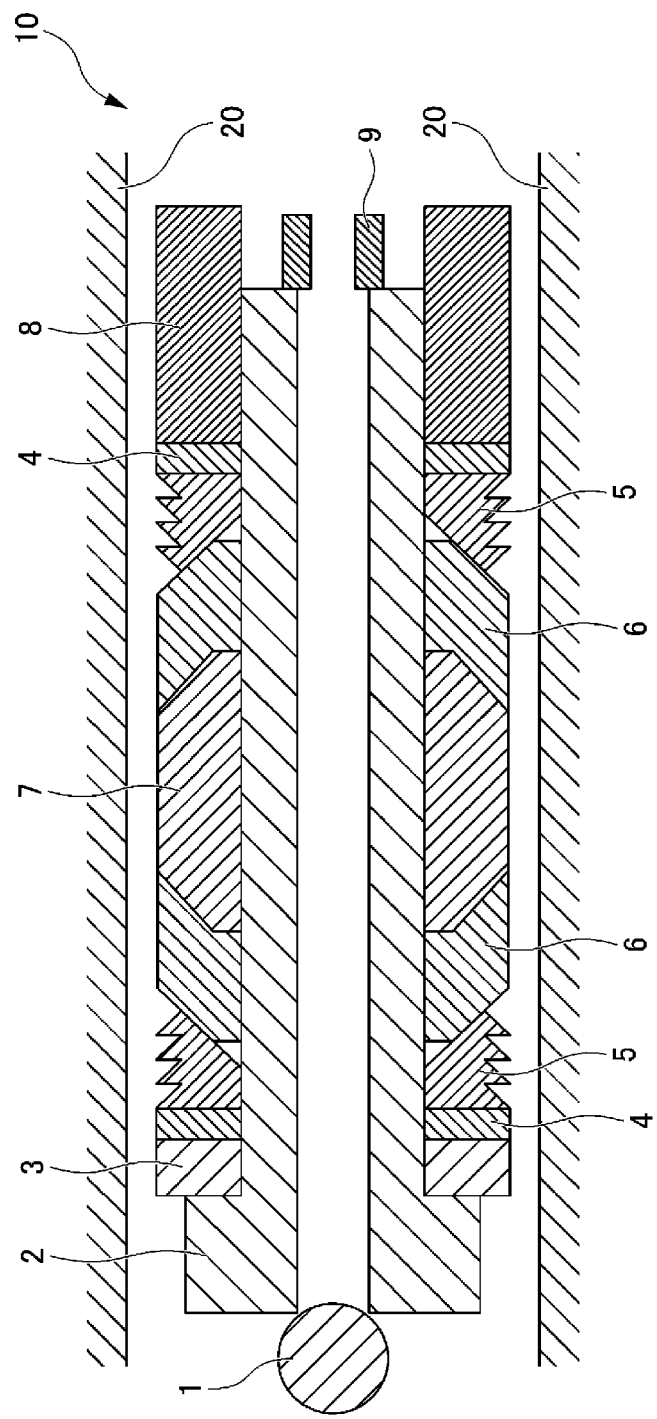
FIG. 1 is a schematic cross-sectional view of a frac plug according to an embodiment of the present invention.

FIG. 1 illustrates a configuration of a frac plug 10 according to an embodiment of the present invention, and is a schematic cross-sectional view thereof taken along a plane including an axial direction of the frac plug 10. As illustrated in FIG. 1, the frac plug 10 according to the present embodiment includes a plurality of members such as a mandrel 2, a load ring 3, a pair of ring-shaped fixing members 4, a pair of slips 5, a pair of cones 6, a center element 7, a bottom 8, and a ball 1, and is inserted into a well such that the axial direction thereof is parallel to a well wall 20.

The frac plug 10 of the present embodiment is a plug for sealing (closing) the wellbore, and is inserted into the wellbore from the ground, and is fed into a predetermined position. When the frac plug 10 is installed in the well, a direction parallel to the well wall 20, that is, the axial direction is defined as a "first direction" of the frac plug 10, and a radial direction orthogonal to the first direction is defined as a "second direction" of the frac plug 10. A cross section parallel to the first direction of the frac plug 10 is referred to as "first cross section", and a cross section parallel to the second direction is referred to as "second cross section".

(Member Made of Mg Alloy)

The frac plug 10 of the present embodiment includes a member made of an Mg alloy. The member made of the Mg alloy has a dual phase structure including: a first phase, which is a base phase; and a second phase present in the first phase. The second phase of the member is distributed in a substantially stripe shape in the first phase in the first cross section, and is distributed in a substantially net shape in the first phase in the second cross section.

(Dual Phase Structure of Member)

Figure 2:
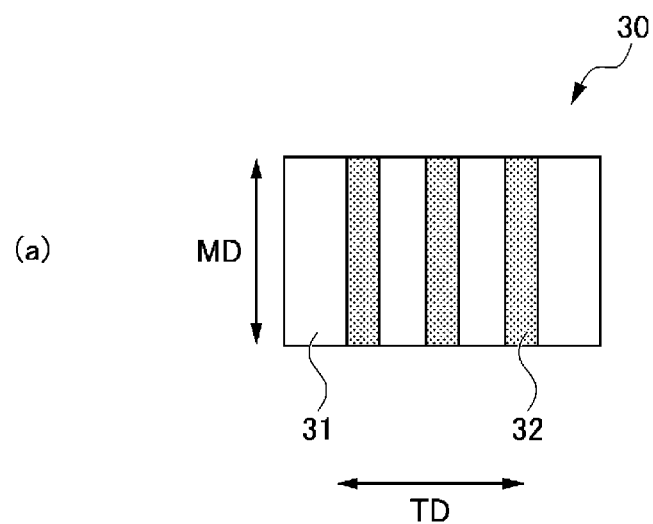
FIG. 2 is a diagram schematically illustrating a metallographic structure when an Mg alloy constituting the frac plug according to an embodiment of the present invention is observed with SEM.
Figure 2:
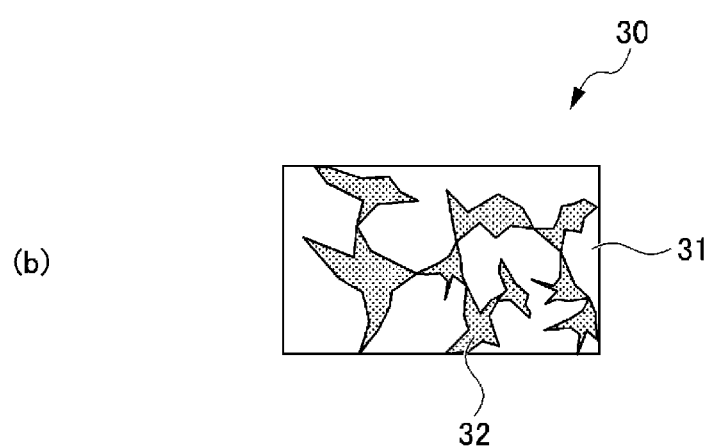

FIG. 2 is a diagram schematically illustrating a metallographic structure of the member made of the Mg alloy, which constitutes the frac plug 10 according to the present embodiment. FIG. 2(a) is a schematic view when the metallographic structure is observed in the first cross section of the frac plug 10, and is configured such that a vertical direction therein, indicated by MD, is the first direction of the frac plug 10, and a horizontal direction therein, indicated by TD, is the second direction of the frac plug 10. Hereinafter, in the metallographic structure of the Mg alloy, a direction corresponding to the first direction of the frac plug 10 may be referred to as a "first direction MD", and a direction corresponding to the second direction may be referred to as a "second direction TD". As illustrated in FIG. 2(a), in the metallographic structure of the member made of the Mg alloy, the second phase is distributed in a stripe shape in the first phase. FIG. 2 (b) is a schematic view when the metallographic structure is observed in the second cross section of the frac plug 10. As illustrated in FIG. 2(b), in the second cross section, the second phase is distributed in a net shape in the first phase. As illustrated in FIGS. 2(a) and 2(b), in the member made of the Mg alloy, which constitutes the frac plug 10 of the present embodiment, the distribution state of the second phase is different between when it is observed in the first cross section and when it is observed in the second cross section.

As illustrated in FIG. 2(a), a second phase 32 in an Mg alloy 30 is present in a state of being distributed in a substantially stripe shape in a first phase 31 in the first cross section. The second phase 32 extends in the first phase while it is continuously or partially interrupted, and forms a substantially stripe-shaped structure. The second phase extends in a substantially stripe shape in the first phase, and thus tensile strength and compressive strength in the extending direction are increased. The member of the present embodiment is disposed so that the second phase extending direction is along the first direction of the frac plug 10, and thus, for example, preferred durability can be attained such that it can withstand water pressure associated with hydraulic fracturing.

Also, as illustrated in FIG. 2(b), the second phase is present in a state of being distributed in a substantially net shape in the first phase, when the member made of the Mg alloy, which constitutes the frac plug 10 of the present embodiment, is observed in the second cross section of the frac plug 10. The term "substantially net shape" as used herein includes not only a state of being formed as a complete sea-island structure but also a state of being continuously or intermittently formed in a net shape while having an interconnection structure. Also, the term "interconnection structure" as used herein indicates a state in which the first phase and the second phase each form a network. That is, the interconnection structure refers to a sea-island structure including net-shaped islands obtained by rebinding once-dispersed islands among sea-island structures, and the binding of the dispersed phase is constant not only on the surface but also in the entire Mg alloy, and thus a substantially net-shaped structure is formed.

(Degradability of Member)

In the member made of the Mg alloy, which constitutes the frac plug 10 of the present embodiment, mainly, degradation due to electron conduction between different phases of the dual phase structure (the first phase and the second phase) is promoted under corrosive environments, for example, in the presence of an electrolyte. The first phase contains Mg and Gd, and the second phase contains Y, and Ni, Cu and/or Zn, and thus degradation is promoted. Furthermore, Co, Fe, and Ca are contained, and thus degradation of the Mg alloy is promoted. In the member made of the Mg alloy, which constitutes the frac plug 10 of the present embodiment, the second phase in the metallographic structure is distributed in a substantially net shape in the first phase that is a base material phase in the second cross section of the frac plug 10, so that total extension of a boundary line between the dual phase structures in the second cross section is longer than that in the first cross section.

(Thickness Decrease Rate)

The frac plug 10 of the present embodiment is used in wellbores in various environments. Here, a thickness decrease rate and a degradation product, based on which degradability in an environment where the frac plug 10 is used is evaluated, will be described. The Mg alloy which constitutes the member made of the Mg alloy of the frac plug 10 of the present embodiment has a thickness decrease rate in the second direction TD higher than a thickness decrease rate in the first direction MD in a 2.0 mass % KCl aqueous solution at 200° F. (93.3° C.). The thickness decrease rate indicates a rate at which the thickness of the surface of the Mg alloy sample decreases when the concentration or temperature of an aqueous potassium chloride (KCl) solution changes. Here, the thickness decrease rate when the second cross section of a sample is degraded so that the thickness in the first direction MD decreases is compared with the thickness decrease rate when the first cross section is degraded so that the thickness of the second direction TD decreases.

In sealing of the wellbore by the frac plug 10 according to the present embodiment, a portion of the member constituting the frac plug 10 is compressed in the first direction, and thus the frac plug 10 is spread in the second direction and closely adhered to the wellbore hole, so that the wellbore is sealed. If the frac plug 10 can be reduced in size in the second direction after completion of the well treatment using the frac plug 10, the sealing of the wellbore can be rapidly released. Thus, the frac plug 10 includes a member that uses an Mg alloy having a higher thickness decrease rate in the second direction than the thickness decrease rate in the first direction.

(Average Thickness Decrease Rate)

Additionally, the frac plug 10 of the present embodiment is preferably formed of an Mg alloy having an average thickness decrease rate of 0.8 mm/h or greater and 10 mm/h or less under environmental conditions in a 0.05 mass % KCl aqueous solution at 250° F. (121.0° C.). The average thickness decrease rate is set to 0.8 mm/h or greater and 10 mm/h or less not in a certain direction, but as a whole. In the evaluation of the average thickness decrease rates of the first direction MD and the second direction TD, a cube sample of an Mg alloy may be used, and the "average thickness decrease rate" in this case refers to an average value of the thickness decrease rates in three directions, i.e., longitudinal, horizontal, and height directions.

The average thickness decrease rate is less than 0.8 mm/h, the degradation is slow, and an undegraded portion remains in the member of the Mg alloy constituting the frac plug 10 in a period of time from the end of fracturing to the start of production of hydrocarbon resources. A removal work with coiled tubing for removing the undegraded portion is required separately. Under a high temperature condition of 250° F. (121.0° C.) and a low salt concentration condition of a 0.05 mass % KCl aqueous solution, a known Mg alloy has an oxide film formed on a surface thereof, and tends to have a lower average thickness decrease rate than that under the low temperature or high salt concentration condition. However, the Mg alloy of the present embodiment exhibits an excellent average thickness decrease rate. Also, when the average thickness decrease rate exceeds 10 mm/h, the degradation is fast, the frac plug 10 loses its water pressure resistance performance against fluid pressure during fracturing, and cannot exhibit a desired closing function.

(Ratio Between Average Thickness Decrease Rates)

The average thickness decrease rate of the Mg alloy in each of KCl aqueous solutions having different concentrations at a constant temperature in a range from 100° F. (37.8° C.) to 150° F. (65.6° C.) is measured, and a ratio between the average thickness decrease rates in the aqueous solutions having different concentrations of KCl is set to 1 time or greater and 4 times or less. The ratio between the average thickness decrease rates of 1 time indicates that the average thickness decrease rate does not change even when the KCl concentration changes. The frac plug 10 using the member made of such Mg alloy is preferred since it is widely applicable to well environments different in temperature and salt concentration.

When the ratio between the average thickness decrease rates exceeds 4 times, the average thickness decrease rate greatly varies depending on the environmental conditions. Thus, the problem that the frac plug 10 used must be changed depending on the environment of the target well, or the configuration or composition of the material must be changed occurs.

(Degradation Product)

A space of the wellbore used in the frac plug 10 of the present embodiment is limited, and, when a volume of the degradation product is larger than a volume of the member before the degradation, the wellbore is filled with the degradation product, which hinders the recovery of petroleum or the like, or the subsequent perforation process. Accordingly, the member constituting the frac plug 10 of the present embodiment preferably allows for a reduction in volume of the degradation product.

(Volume Ratio of Degradation Product)

The member made of the Mg alloy constituting the frac plug 10 of the present embodiment is made of an Mg alloy which produces a degradation product in a 2.0 mass % KCl aqueous solution at 200° F. (93.3° C.), and in which a volume of the degradation product is 2.5 times or less relative to a volume of the member before degradation (hereinafter referred to as "volume ratio"). By applying the volume ratio of the degradation product, even when the weight of the degradation product is different due to a difference in specific gravity of alloy elements, closing the wellbore can be controlled as a volume property. The Mg alloy immersed in the KCl aqueous solution produces a water-insoluble hydroxide while generating hydrogen. The degradation product is composed of mainly $Mg(OH)_2$, and other insoluble by-products.

By measuring the degradation product under conditions in the 2.0 mass % KCl aqueous solution at 200° F. (93.3° C.), which is close to environments of usual wells for petroleum and natural gas, and reflecting the measurement results in the design of the frac plug 10, the frac plug 10 using the Mg alloy can be made to cope with various environments. In Mg alloy containing Y, Cd, Cu, Zn, and Ni, the ratio (volume ratio) of degradation product/member before degradation in the 2.0 mass % KCl aqueous solution at 200° F. (93.3° C.) is set to 2.5 times or less. Furthermore, the ratio is preferably 2 times or less. The volume of the degradation product is prevented from being too large, and thus efficient utilization of the wellbore can be realized, which enables easy production/recovery process of petroleum or the like.

(Composition of Mg Alloy)

Hereinafter, the Mg alloy constituting the frac plug 10 of the present embodiment will be described in detail.

Due to the fact that the Mg alloy constituting the frac plug 10 according to the present embodiment has a dual phase structure including: a first phase, which is a base phase including Mg and Gd as the following additional elements, and a second phase including one or both of Y and one or more components of Ni, Cu, and Zn, or due to the presence of water which is a solvent in a well drilling fluid such as a fluid, the Mg alloy becomes easy to degrade by an acid or an alkali.

(Additional Element of Mg Alloy)

The Mg alloy preferably has a component composition containing Ni: from 1.0 to 8.0 mass %, Gd: from 1.0 to 8.0 mass %, Y: from 0.1 to 1.5 mass %, Cu: from 0.1 to 1.5 mass %, and Zn: from 0.1 to 1.5 mass %, the balance being composed of Mg and unavoidable impurities.

The first phase contains one or both of Mg and Gd, and specifically can be formed as a phase containing Mg, a phase containing Gd, and a phase containing Mg and Gd. The second phase contains one or both of Y and one or more components of Ni, Cu, and Zn, and specifically can be formed as a phase containing Y, a phase containing Ni and/or Cu, and a phase containing Y and Ni and/or Cu.

(Ni: From 1.0 to 8.0 Mass %)

Ni (nickel) is a component contained together with Y in the second phase and capable of enhancing the degradability of the Mg alloy, and thus a content of Ni is preferably 1.0 mass % or greater. On the other hand, when the Ni content exceeds 8.0 mass %, brittleness tends to increase, and the tensile strength in the second direction TD of the frac plug 10 tends to decrease. Therefore, the Ni content is preferably in a range from 1.0 to 8.0 mass %, and more preferably in a range from 4.5 to 8.0%.

(Gd: From 1.0 to 8.0 Mass %)

Gd (gadolinium) is a component contained in the first phase as the base phase, uniformly dispersed therein, enhancing the degradability of the Mg alloy, and miniaturizing crystal grains of the Mg alloy to improve mechanical properties thereof, and thus a content of Gd is preferably in a range from 1.0 to 8.0 mass %.

(Y: From 0.1 to 1.5 Mass %)

Y (yttrium) is a component contained in the second phase, enhancing the degradability of the Mg alloy, and miniaturizing crystal grains of the Mg alloy to improve the mechanical properties thereof, and thus a content of Y is preferably in a range from 0.1 to 1.5 mass %.

(Cu: From 0.1 to 1.5 Mass %)

Cu (copper) is a component contained together with Y in the second phase, and capable of providing high degradability of the Mg alloy, and thus a content of Cu is preferably from 0.1 mass % or greater. On the other hand, when the Cu content exceeds 1.5 mass %, the brittleness tends to increase, and the tensile strength tends to decrease. Therefore, the Cu content is preferably in a range from 0.1 to 1.5 mass %.

(Zn: From 0.1 to 1.5 Mass %)

Zn (zinc) is a component contained together with Y in the second phase, and capable of providing high degradability of the Mg alloy, and thus a content of Zn is preferably in a range from 0.1 to 1.5 mass %.

(Co, Fe, and Ca)

The Mg alloy contain, as essential components, Ni, Gd, Y, Cu, and Zn described above, but, optionally, as an optional component, at least one component selected from the group consisting of Co: from 0.01 to 0.3 mass %, Fe: from 0.01 to 0.3 mass %, and Ca: from 0.01 to 0.3 mass %.

(Co: 0.1 Mass % or Less)

Additionally, by addition of Co, high degradability and high tensile strength of the Mg alloy can be obtained. More preferably, a content of Co is 0.1 mass % or less.

(Fe: 0.1 Mass % or Less)

Additionally, by addition of Fe, high degradability and high tensile strength of the Mg alloy can be obtained. More preferably, a content of Fe is 0.1 mass % or less.

(Ca: 0.1 Mass % or Less)

Additionally, by addition of Ca, high degradability and high tensile strength of the Mg alloy can be obtained. More preferably, a content of Ca is 0.1 mass % or less.

(Balance and Unavoidable Impurities)

The balance is composed of Mg and unavoidable impurities. A content of Mg is preferably at least 75 mass %, and a total amount of the additional elements other than Mg is preferably less than 25 mass %. When an amount of the additional elements to be added exceeds 25 mass %, it is difficult to attain both high strength and excellent degradability properties. In particular, the degradability is increased, which increases the risk that the frac plug 10 may loses its water pressure resistance performance against fluid pressure, and cannot exhibit a desired closing function.

The unavoidable impurities are components mixed by raw materials such as ore and scrap and various factors in the manufacturing process when Mg is industrially manufactured, and are allowed within a range in which the present invention is not adversely affected. Examples of the unavoidable impurities include Mn, Na, Si, and Mo.

(Frac Plug Material)

A member constituting the frac plug 10, other than the member made of the Mg alloy, is formed of a metal material such as an Mg alloy other than the Mg alloy described above, a calcium alloy (Ca alloy), an aluminum alloy (Al alloy), or stainless steel (SUS), a resin material, a wood, a composite material including a fiber material such as carbon fibers as a reinforcing material, or the like. Among them, a degradable resin or a degradable metal that degrades when exposed to a well environment is preferred, and a degradable metal such as an Mg alloy is particularly suitable. The Mg alloy can have both high strength and excellent degradability by adjusting the component composition and the like thereof.

Hereinafter, the members constituting the frac plug 10 of the present embodiment will be described.

(Mandrel)

The mandrel 2 is a member for ensuring the strength of the frac plug 10 and has a cylindrical shape disposed along the first direction of the frac plug 10.

Various members for constituting the frac plug 10 as a whole are attached to surround an outer peripheral surface of the mandrel 2. The mandrel 2 is a large member in the frac plug 10, and a material therefor is not particularly limited. However, the mandrel 2 is preferably formed of a degradable metal, particularly, an Mg alloy having the configuration described above.

(Center Element)

The center element 7 is an annular rubber member for filling a gap between the mandrel 2 and the well wall 20 in the frac plug 10 to seal the wellbore, and is deformed under pressure. The center element 7 is attached to surround the outer peripheral surface of the mandrel 2. A thickness, elasticity, inner diameter, outer diameter, width in an axial direction, or the like of the center element 7 may be appropriately determined according to the size of the mandrel 2, the pressure applied to the frac plug 10, or the like. Examples of materials used for forming the center element 7 include urethane rubber, nitrile rubber, hydrogenated nitrile rubber, acrylic rubber, and fluororubber. Degradable urethane rubber, which is a material that degrades in a well environment, is preferred in order to facilitate removal of the frac plug 10 from the well.

(Cone)

The cones 6 are a pair of annular members which each transmit pressure directly and indirectly to the center element 7. The cones 6 are attached to surround the outer peripheral surface of the mandrel 2. The cones 6 located on upstream and downstream sides of the center element 7 are disposed so as to sandwich the center element 7 from both sides, and are attached in contact with the center element 7. The cones 6 are hollow conical members. In the present specification, the term "conical" refers to a cone, a truncated cone, or a combined shape of a cylinder therewith. A material for the cones is not particularly limited. However, the cones are preferably formed of a degradable metal, particularly, an Mg alloy having the configuration described above.

(Slip)

The slips 5 are a pair of annular members, are attached to surround the outer peripheral surface of the mandrel 2, and are in contact with side surfaces (inclined surfaces) of the conical cones 6, respectively. The slips 5 have an inner surface shape formed with an inclination such that an inner diameter thereof decreases from the center element 7 side toward one end of the mandrel 2, corresponding to an inclination of the side surfaces (inclined surfaces) of the cones 6. A plurality of slip pieces may be formed so as to be annular. When the frac plug 10 is actuated and a compressive force in the first direction of the frac plug 10 acts on the slips 5, the slips are moved along the side surfaces (inclined surfaces) of the cones 6 while diameters thereof are enlarged, and outer surfaces of the slips 5 are closely adhered and fixed to the well wall 20. A material for the slips 5 is not particularly limited. However, the slips are preferably formed of a degradable resin or a degradable metal, particularly, an Mg alloy having the configuration described above.

(Ring-Shaped Fixing Member)

The ring-shaped fixing members 4 are a pair of annular members, and have a function of realizing uniform enlargement in diameter of the slips 5 when the frac plug 10 is actuated, and, additionally, transmit pressure indirectly to the center element 7. The ring-shaped fixing members 4 are attached to surround the outer peripheral surface of the mandrel 2 and are in contact with the slips 5, respectively. A material for the ring-shaped fixing members 4 is not particularly limited. However, the ring-shaped fixing members 4 are preferably formed of a degradable metal, particularly, an Mg alloy having the configuration described above.

(Load Ring)

The load ring 3 is an annular member which directly receives a pressure applied from an upstream side of the well and transmits the pressure to an adjacent member, thereby making it possible to indirectly transmit the pressure to the center element 7. The load ring 3 is attached to surround the outer peripheral surface of the mandrel 2 in a state of being in contact with the ring-shaped fixing member 4. A material for the load ring 3 is not particularly limited. However, the load ring 3 is preferably formed of a degradable metal, particularly, an Mg alloy having the configuration described above.

(Bottom)

The frac plug 10 has the bottom 8 as illustrated in FIG. 1 in addition to the above-described members. The bottom 8 is an annular member, and is attached to surround the outer peripheral surface of the mandrel 2. The arrangement may be determined appropriately according to need. A material for the bottom 8 is not particularly limited as long as the material can exhibit a function. However, the bottom 8 is preferably formed of a degradable metal, particularly, an Mg alloy having the configuration described above.

(Ball)

The ball 1 seals a hollow portion of the mandrel 2 by being seated on a ball seat (not illustrated) provided in the hollow portion of the mandrel 2 which is also a flow path of the frac plug 10. A shape of the ball 1 is usually spherical, but is not particularly limited as long as the ball 1 can be seated on the ball seat to seal the hollow portion of the mandrel 2, and can be any shape. A material constituting the ball 1 is not particularly limited as long as the material can exhibit each function. However, the ball 1 is preferably formed of a degradable metal, particularly, an Mg alloy having the configuration described above.

(Shear Sub)

The shear sub 9 is a member for connecting a setting tool (not illustrated) to actuate the frac plug 10 and the frac plug 10. In particular, an adapter rod of an adapter kit (not illustrated) connected to the setting tool and the shear sub 9 engaged with the mandrel 2 are connected. By pulling the adapter rod in a direction of the setting tool while holding from the load ring 3 to the bottom 8 with another member of the adapter kit, a compressive force in the first direction is applied to the frac plug 10, whereby the slips 5 and the center element 7 are enlarged in diameter. As a result, the frac plug 10 can be fixed to the well wall 20 and sealing the gap between the mandrel 2 and the well wall 20 can be attained.

In particular, a very large force (tensile force, compressive force, shearing force, etc.) is applied to the mandrel 2 and the slips 5 when the frac plug 10 is disposed in the wellbore or during a well treatment operation such as fracturing in which a high water pressure is applied, and thus strength which can withstand the force is required. A frac plug 10 including a member made of an Mg alloy is suitable as the frac plug 10.

(Modified Example of Frac Plug)

Another embodiment of the frac plug 10 of the present invention can be a frac plug 10 provided with one slip 5 and the corresponding one cone 6.

(Method for Manufacturing Member)

The present embodiment is a method for manufacturing the frac plug 10 including a member made of an Mg alloy,
the method including: a step of extrusion-molding the Mg alloy; and a step of cutting the extrusion-molded Mg alloy,
wherein the member constituting the frac plug 10 has a dual phase structure including: a first phase, which is a base phase; and a second phase present in the first phase, and
wherein, in the dual phase structure, the second phase is distributed in a substantially stripe shape in the first phase in a first cross section of the frac plug 10, and is distributed in a substantially net shape in the first phase in a second cross section of the frac plug 10.

A step of extrusion-molding a cast product formed by melt molding and a step of cutting the molded product formed by extrusion molding into a member by a cutting process can be carried out to provide a target member. Specifically, as a melt molding method, injection molding, compression molding, extrusion molding or the like can be adopted. Further, a member can be manufactured by applying a cutting process such as cutting or perforation to a molded product obtained by the melt molding method as a preform (which may have a shape such as a rod shape, a hollow shape, or a plate shape). Particularly preferably, the member of the frac plug 10 can be manufactured by an extrusion process and a cutting process. At this time, in the member, a direction in which the second phase as the substantially striped-shaped structure of the member extends and the first direction of the frac plug 10 are aligned with each other. Additionally, the substantially net-shaped structure in a cross section of the member is disposed parallel to the second direction of the frac plug 10.

(Tensile Strength of Member)

The Mg alloy preferably has a tensile strength of 300 MPa or greater, and more preferably 350 MPa or greater, in at least one direction. The Mg alloy of the present embodiment has anisotropy in tensile strength, and can also withstand a high water pressure load in the first direction of the frac plug 10 by setting the direction in which the second phase extends, that is a direction where the tensile strength is high, as the first direction of the frac plug 10. Furthermore, as the tensile strength in the first direction is higher, it is possible to reduce the size and weight of the frac plug 10. Due to degradation of the Mg alloy, the frac plug has a high initial compressive strength and can maintain a compressive strength for a certain period of time, and, after use, can be rapidly degraded. Therefore, a degradation reaction of the Mg metal is performed without injecting an acidic fluid into the wellbore, degradation and removal are quickly performed, whereby well excavation can be efficiently performed.

(Thickness of Frac Plug)

The frac plug 10 may be formed by machining a stock shape, and a diameter of the stock shape is from 5 to 500 mm, preferably from 20 to 300 mm, and more preferably from 30 to 200 mm. A minimum thickness of the member obtained by machining is preferably in a range from 1.5 to 45 mm. This thickness makes it possible to appropriately exhibit the functions in various well environments, and to easily degrade the members after use. The stock shape may have various shapes such as a round rod shape, a flat plate shape, a hollow shape such as a pipe, and an irregular shape. The stock shape preferably has a round rod shape, a hollow shape, or a flat plate shape because it is easy to perform extrusion molding and the subsequent densification process and the stock shape having such a shape is often suitable for a cutting process. In particular, more preferably, the stock shape has a round rod or a hollow substantially cylindrical shape for forming the mandrel 2 of the frac plug 10.

(Method for Sealing Well)

The present embodiment is a method for sealing a well using the frac plug 10 including a member made of an Mg alloy, the method including a step of inserting the frac plug 10 into a well, installing the frac plug 10 in the well, and completing sealing; and degrading the member constituting the frac plug 10 by a fluid existing in a well environment to release the sealing by the frac plug 10 in the well. The member constituting the frac plug 10 has a dual phase structure including: a first phase, which is a base phase; and a second phase present in the first phase. In the dual phase structure, the second phase is distributed in a substantially stripe shape in the first phase in a first cross section of the frac plug 10, and is distributed in a substantially net shape in the first phase in a second cross section of the frac plug 10. Thus, the member constituting the frac plug 10 can exhibit excellent degradability.

(Operation of Frac Plug)

A method for sealing a well, including a step in which the frac plug 10 is actuated and fixed to the well wall 20 will be described below. The frac plug 10 is actuated after being disposed at a predetermined position of the wellbore, and sealing is carried out. After the frac plug 10 is inserted to a predetermined position, the center element 7 is enlarged in diameter and brought into contact with the well wall 20, and sealing between the mandrel 2 and the well wall 20 is performed. That is, when the frac plug 10 is actuated in the wellbore, members provided on at least one side among the members adjacent to sandwich the center element 7 move in the axial direction of the mandrel 2 toward the center element 7. In further detail, the slips 5 slide on the side surfaces (inclined surfaces) of the cones 6, respectively, and the slips 5 moves while the diameters thereof are enlarged to be in contact with the wellbore wall 20. At the same time, pressure is transmitted indirectly or directly to the center element 7 from the cones 6, and the center element 7 is compressed in the first direction, so that the outer diameter of the center element 7 is enlarged accordingly.

As a result, the outer peripheral surface of the center element 7 is brought in contact with the well wall 20, closes the gap between the mandrel 2 and the well wall 20, and cooperates with the slips 5 in contact with the well wall 20 to fix the frac plug 10 to the wellbore. After the frac plug 10 is fixed to the predetermined position in the wellbore, the ball 1 is fed into the wellbore and seated on the frac plug 10, thereby closing a hollow portion of the mandrel 2 and completing the closing of the wellbore. Thereafter, water is injected from a wellhead direction, so that water is filled from the fixed position of the frac plug 10 toward the wellhead side, and water pressure is applied to the well. This water pressure causes cracks in the stratum.

Thereafter, the sealing can be released by degrading the frac plug 10, which seals the wellbore, in the environment in the well, within a desired period of time, prior to starting production of petroleum, natural gas, or the like present in the production reservoir. As a result, according to the method for sealing a well of the present embodiment does not require the operation of destroying the sealing function for releasing the sealing, and much expense and time which have been required to destroy or fragmentate, by crushing, perforation, or any other method, many frac plugs 10 remaining inside the well and or component members thereof, which makes it possible to reduce the expense and shorten the process of well drilling. Furthermore, the frac plug 10 remaining after the stimulation of the production reservoir has been finished preferably disappears completely by the time production is begun. Even if the frac plug 10 does not disappear completely, as long as the frac plug 10 is in a state that its strength decreases and it can be degraded or collapsed by stimulation such as water flow in the well, it can be easily recovered, and this does not cause clogging in the wellbore, and thus does not hinder production of petroleum, natural gas, or the like. In addition, normally, at a higher temperature of the downhole, the frac plug 10 can be degraded in a short time. In this way, when the method for sealing a well of the present embodiment is performed using a frac plug having a member made of an Mg alloy having high strength and excellent degradability, the frac plug seals a wellbore at a high strength after being inserted into the wellbore, is then rapidly degraded/disintegrated and removed, and thus enables efficient production of petroleum or the like.

EXAMPLES

An example of the present invention will be described below. Various aspects of the present invention are possible, and the present invention is not limited to the following example.

(Composition of Mg Alloy)

Components of an Mg alloy used for the frac plug, which is an embodiment of the present invention, were mixed in the composition shown in Table 1 below, then melted and cast to obtain a cast product. The cast product was then formed into a cylindrical shape by an extrusion process.

TABLE 1

| Composition of Mg alloy [mass %] | | | | | |
|---|---|---|---|---|---|
| Mg | Zn | Cu | Ni | Gd | Y |
| Bal. | 0.5 | 0.9 | 5.7 | 5.6 | 0.7 |
| Ca | Mn | Fe | Si | Na | Co | Mo |
| 0.03 | 0.02 | 0.02 | 0.03 | 0.03 | 0.004 | 0.01 |

(Bal.: balance)

(SEM Observation of Metallographic Structure)

Shown below is a metallographic structure of the Mg alloy used in the frac plug of the present invention. FIG. 3(a) is a schematic view of a sample when prepared by cutting the Mg alloy used in the frac plug of one embodiment of the present invention into a cylindrical shape (in FIG. 3(a), the first direction MD corresponds to an axial direction which is the first direction of the frac plug, the second direction TD corresponds to the second direction which is the second direction of the frac plug). FIG. 3(b) is a mapping photograph when a side peripheral surface of the sample illustrated in FIG. 3(a), corresponding to the first cross section of the frac plug 10, is subjected to elemental analysis using an SEM-EDS device. FIG. 3(c) is a mapping photograph when a bottom surface of the sample illustrated in FIG. 3(a), corresponding to the second cross section of the frac plug 10, is subjected to elemental analysis using the SEM-EDS device. Hereinafter, the cross section of the Mg alloy sample corresponding to the first cross section of the frac plug 10 may be referred to as "first cross section", and the cross section of the Mg alloy sample corresponding to the second cross section of the frac plug 10 may be referred to as "second cross section".

(SEM-EDS (Energy Dispersive X-Ray Spectrometry) Observation Method)

The metallographic structure of the Mg alloy was observed using the following SEM-EDS device.

SEM device: Field emission scanning microscope (FE-SEM) available from Hitachi High-Tech Corporation.

Model: SU8220 EDS device: X Flash 5060 Flat QUAD from Bruker

The observation method will be described below.

(1) The Mg alloy was processed using a precision cutting machine to prepare a sample having a first cross section and a second cross section.

(2) The sample was mirror-polished with a flat surface grinder, and then the polished surface was etched with an ion milling device.

(3) Etching was performed twice under etching conditions: an acceleration voltage of 5 kV and a processing time of 10 minutes, and plane milling was performed at ordinary temperature.

(4) SEM-EDS analysis was performed on the etched surface, and mapping was performed. The measurement conditions are eccentricity of 4 mm, an irradiation angle of 30°, use of a reflected electron image (LAO/U) and an uneven image (SE (L)), and a magnification of 300 times.

(SEM Image of Metallographic Structure)

When observed in the first cross section as illustrated in FIG. 3(b), in the Mg alloy, the second phase is present in a state of being distributed in a stripe shape in the first phase. When observed in the second cross section as illustrated in FIG. 3(c), the second phase is present in a state of being distributed in a net shape in the first phase. As illustrated in FIGS. 3(b) and 3(c), in the Mg alloy which constitutes the frac plug of the present embodiment, the distribution state of the second phase is different between when it is observed in the first cross section and when it is observed in the second cross section.

As illustrated in FIG. 3(b), Y and Ni are deposited in a substantially stripe shape between the Mg base phases. Degradation is promoted between the layer of Y and Ni and the Mg phases. Also, as illustrated in FIG. 3(c), it is clear that the second phase of Ni/Y is deposited in a net shape around the crystal grains of the Mg phase of the first phase.

(Area Rate of Surface Structure, Measurement of Length of Boundary Region)

Further, in FIGS. 3(b) and 3(c), area rates (%) of the first phase and the second phase in the first cross section and the second cross section and a length of the boundary between the first phase and the second phase were measured. These results are shown in Table 2.

TABLE 2

|  | Area rate [%] | | Boundary length [nm] |
| --- | --- | --- | --- |
|  | First phase | Second phase |  |
| First cross section | 71.0 | 29.0 | 13675907 |
| Second cross section | 69.5 | 30.5 | 19138115 |

The area rates (%) of the first phase and the second phase in the first cross section and the second cross section are both approximately 70(%):30(%), which are approximately equal to each other. The length of the boundary was found to have a large value in the second cross section having a "substantially net-shaped" structure.

(Measurement of Thickness Decrease Rate)

Next, directionality associated with the degradability of the Mg alloy was evaluated. The degradability of the Mg alloy is evaluated based on the thickness decrease rate.

(1) The product processed by an extrusion process was cut into 1 cm×1 cm×1 cm cube.
(2) A potassium chloride (KCl) aqueous solution having a predetermined concentration was prepared in a 1-L beaker, and heated to a predetermined temperature.
(3) A resin net (made of PE) was put into the beaker, and the Mg alloy was installed therein.
(4) The Mg alloy was taken out at a predetermined time, the dimension and weight of the Mg alloy were measured, and the thickness decrease rate was calculated.

The thickness decrease rate when the concentration of the potassium chloride (KCl) aqueous solution and the temperature are changed will be indicated below.

TABLE 3

| | Thickness decrease rate [mm/h] (both sides) | | | | |
| --- | --- | --- | --- | --- | --- |
| Salt concentration | 0.01% KCl | 0.02% KCl | 0.05% KCl | 0.3% KCl | 2% KCl |
| (a) | | | | | |
| Temperature 75° F. | — | — | — | — | — |
| 100° F. | — | — | — | — | 0.3800 |
| 120° F. | 0.0506 | 0.1975 | 0.3158 | 0.3934 | 0.4070 |
| 135° F. | — | — | 0.2082 | 0.7260 | 0.9700 |
| 150° F. | 0.2009 | 0.4073 | 0.2233 | 0.7012 | 1.3000 |
| 200° F. | — | — | 0.3730 | 1.2900 | 2.2350 |
| 250° F. | — | — | 0.8240 | — | — |

TABLE 3-continued

| | Thickness decrease rate [mm/h] (both sides) | | | | |
| --- | --- | --- | --- | --- | --- |
| Salt concentration | 0.01% KCl | 0.02% KCl | 0.05% KCl | 0.3% KCl | 2% KCl |
| (b) | | | | | |
| Temperature 75° F. | — | — | — | — | — |
| 100° F. | — | — | — | — | 1.0660 |
| 120° F. | 0.2323 | 0.5781 | 0.8700 | 1.0358 | 1.3900 |
| 135° F. | — | — | 0.5408 | 0.9325 | 1.9975 |
| 150° F. | 0.3975 | 0.7271 | 0.7528 | 1.3674 | 1.8340 |
| 200° F. | — | — | 1.1049 | 2.3754 | 3.4065 |
| 250° F. | — | — | 1.5275 | — | — |

(—: not measured)

Table 3(a) shows results of measuring the thickness decrease rate when the second cross section (the surface including the second direction TD) of the sample is corroded and the thickness in the first direction MD decreases. Table 3(b) shows the thickness decrease rate when the first cross section (the surface including the first direction MD) is corroded and the thickness in the second direction TD decreases.

From Tables 3(a) and 3(b), at all of the temperatures and the salt concentrations, the numerical values of the thickness decrease rate in the second direction TD are larger. Therefore, it is clear that the first cross section having a dual phase structure in which the second phase is present in a state of being distributed in a substantially stripe shape in the first phase is easily corroded, and that degradation in the second direction TD preferentially proceeds in the member made of the Mg alloy. This is considered to be advantageous because, by matching the first direction MD of the member made of the Mg alloy with the first direction of the frac plug, the numerical values of the thickness decrease rate in the second direction, which is the radial direction of the frac plug, are larger, so that decomposition occurs early in the well. The reason why the decomposition in the second direction TD preferentially proceeds is, for example, because the first phase corrodes from the interface with the second phase, and thus some of the first phases and the second phases having the substantially striped structure in the first cross section are completely corroded and removed, and others thereof are peeled off and removed, and because the substantially striped structure allows the electrolyte to easily penetrate into the Mg alloy.

(Measurement of Volume Ratio Between Before and After Degradation)

The volume ratio between before and after degradation is determined by dividing the volume of the degradation product by the volume of the member before degradation. The volume is determined by dividing the mass by the true density. To produce the degradation product, a 2.0 mass % KCl aqueous solution at 200° F. (93.3° C.) was used. The wellbores had different salt concentrations and temperatures, but measured conditions that could be evaluated as normal well conditions were used. The measurement procedure will be shown below.

(Weight Measurement Method)

(1) A 1-L beaker is placed in an oil bath, and 1 kg of a solution prepared to attain 2.0 mass % KCl in the beaker is heated to 200° F. (93.3° C.).
(2) A PE (polyethylene) resin net is mounted in the beaker, and the sample is put on top of the net and degraded.
(3) The weight of a filter paper (ADVANTEC TOYO, NO. 3, diameter: 110 mm) is measured.

(4) The degradation product is filtered using the filter paper whose weight has been measured.
(5) The filter paper and the degradation product are dried in an oven at 110° C. for 1 hour.
(6) The weight of the degradation product is measured. (The weight of the degradation product was measured together with the filter paper, and the weight of the filter paper is subtracted from the measured weight later.)
(7) The above operations (5) and (6) are repeatedly performed until the weight change becomes ±0.01 g.

(True Density Measurement Method)

The conditions for measurement are (1) use of He gas for volume measurement, and (2) pressure fluctuation value: 0.005 psi/min.
(1) The sample was dried in an oven at 110° C., taken out every 1 hour, and dried until no weight change was observed.
(2) The sample is weighed to attain 1 to 1.5 g.
(3) The true density of each sample was measured using a dry automatic densitometer: Accupyc II 1340 (available from Shimadzu Corporation).

TABLE 4

| | Mass [g] | Degradation product | | Degradation product/ before degradation | |
|---|---|---|---|---|---|
| | before degradation | Mass [g] | True density [g/cm³] | Mass ratio | Volume ratio |
| Examples | 2.00 | 4.52 | 2.35 | 2.29 | 1.93 |

The measurement results are shown in Table 4. The mass ratio of Example 1 (ratio between the mass of the degradation product and the mass before degradation) was 2.29. The volume ratio (ratio between the volume of the degradation product and the volume before degradation) was 1.93. As a result, in Example 1, the mass ratio is large, but the volume ratio is as small as 1.93. Since the volume ratio is 2.5 times or less, the frac plug formed from the Mg alloy of Example 1 or the member thereof will less close the wellbore after the degradation.

(Measurement of Average Thickness Decrease Rate)

The average thickness decrease rate of the Mg alloy in the 0.05 mass % KCl aqueous solution at 250° F. (121.0° C.) was measured by the following procedure.
(1) A 1-L beaker is charged with 1 L of a KCl aqueous solution prepared to have a concentration of 0.05%.
(2) The aqueous solution is heated to a predetermined temperature of 250° F. (121.0° C.).
(3) A PE resin net is put in the beaker, and adjustment is made so that the lowest point of the net is the center of the beaker.
(4) An Mg alloy sample (dimensions: 1 cm×1 cm×1 cm) is placed.
(5) After the elapse of a predetermined time, the sample is taken out, and three dimensions are measured with a caliper, specifically, the three sides, i.e., length, width, and height of the cube are measured.
(6) From the dimensions of the three sides, i.e., length, width, and height, the difference in amount of decrease in thickness at each degradation time is calculated, and the amount of decrease in thickness is calculated as an average value.
(7) The "time" is plotted on the horizontal axis, and the "amount of decrease in thickness" is plotted on the vertical axis. A slope obtained within a range from 1 to 50 hours as time is defined as average thickness decrease rate.

(Measurement of Average Thickness Decrease Rate)

For Example 1, the measurement results of the average thickness decrease rate (mm/h) in a 0.05 mass % KCl aqueous solution at 250° F. (121.0° C.) are shown in Table 5.

TABLE 5

| | Average thickness decrease rate [mm/h] |
|---|---|
| Examples | 1.293 |

As shown in Table 5, Example 1 had an average thickness decrease rate of 0.8 (mm/h) or greater. Therefore, by using the frac plug using this Mg alloy in the wellbore, the frac plug is rapidly degraded/disintegrated and disappears over time, or slight residue is easily degraded/disintegrated by using a drill or the like, and can be easily removed.

(Ratio Between Average Thickness Decrease Rates)

The average thickness decrease rate was measured at a temperature of each of a 0.05 mass % KCl aqueous solution and a 2.0 mass % KCl aqueous solution set to 100° F. (37.8° C.), and a ratio of the average thickness decrease rate at a KCl aqueous solution concentration of 2.0 mass % to that at a KCl aqueous solution concentration of 0.05 mass % was measured.

TABLE 6

| | Average thickness decrease rate [mm/h] | | Ratio between average thickness decrease rates |
|---|---|---|---|
| | 0.05 mass % KCl solution | 2.0 mass % KCl solution | |
| Examples | 0.27 | 0.82 | 3.04 |

As shown in Table 6, since the ratio between the average thickness decrease rates in Example 1 is as small as 3.04, frac plugs including members made of Mg alloys having the same composition can be used even for wells having different salt concentrations.

Next, the temperature was set to 150° F. (65.6° C.), and the ratio of the average thickness decrease rate at a KCl aqueous solution concentration of 2.0 mass % to that at a KCl aqueous solution concentration of 0.05 mass % was measured. The measurement results are shown in Table 7.

TABLE 7

| | Average thickness decrease rate [mm/h] | | Ratio between average thickness decrease rates |
|---|---|---|---|
| | 0.05 mass % KCl solution | 2.0 mass % KCl solution | |
| Examples | 0.71 | 1.44 | 2.01 |

As shown in Table 7, even when the temperature of the KCl aqueous solution is changed to 150° F. (65.6° C.), the same result is obtained. That is, the ratio between the average thickness decrease rates in Example 1 is as small as 2.01. Thus, the same frac plug can be used even for wells having different salt concentrations.

REFERENCE SIGNS LIST

1: Ball
2: Mandrel
3: Load ring
4: Ring-shaped fixing member
5: Slip
6: Cone
7: Center element
8: Bottom
9: Shear sub
10: Frac plug
20: Well wall
30: Mg alloy
31: First phase
32: Second phase
MD: First direction
TD: Second direction

The invention claimed is:

1. A frac plug comprising a member made of an Mg alloy, wherein the member has a dual phase structure including: a first phase, which is a base phase; and a second phase present in the first phase, and
in the dual phase structure, the second phase is distributed in a substantially stripe shape in the first phase in a first cross section orthogonal to a second direction of the frac plug, and is distributed in a substantially net shape in the first phase in a second cross section orthogonal to a first direction of the frac plug, and
the member has a thickness decrease rate in the second direction higher than a thickness decrease rate in the first direction in a 0.05 mass % KCl aqueous solution at 250° F. (121.0° C.), and
where, when the frac plug is installed in a well, a direction parallel to a well wall, that is, an axial direction is defined as the first direction of the frac plug, and a radial direction orthogonal to the first direction is defined as the second direction of the frac plug.

2. The frac plug according to claim 1, wherein the Mg alloy has a component composition containing Ni: from 1.0 to 8.0 mass %, Gd: from 1.0 to 8.0 mass %, Y: from 0.1 to 1.5 mass %, Cu: from 0.1 to 1.5 mass %, and Zn: from 0.1 to 1.5 mass %, the balance being composed of Mg and unavoidable impurities.

3. The frac plug according to claim 1, wherein the first phase contains one or both of Mg and Gd, and the second phase contains one or both of Y and one or more components of Ni, Cu, and Zn.

4. The frac plug according to claim 1, wherein the Mg alloy further contains at least one component selected from the group consisting of Co: from 0.01 to 0.3 mass %, Fe: from 0.01 to 0.3 mass %, and Ca: from 0.01 to 0.3 mass %.

5. The frac plug according to claim 1, wherein the member produces a degradation product in a 2.0 mass % KCl aqueous solution at 200° F. (93.3° C.), and a volume of the degradation product is 2.5 times or less relative to a volume of the member before degradation.

6. The frac plug according to claim 1, wherein the member has an average thickness decrease rate of 0.8 mm/hr or greater and 10 mm/hr or less in a 0.05 mass % KCl aqueous solution at 250° F. (121.0° C.).

7. The frac plug according to claim 1, wherein the member has a ratio of an average thickness decrease rate in a 2.0 mass % KCl aqueous solution to the average thickness decrease rate in the 0.05 mass % KCl aqueous solution of 1 time or greater and 4 times or less, in a range from 100° F. (37.8° C.) to 150° F. (65.6° C.).

8. The frac plug according to claim 1, wherein the frac plug has a substantially cylindrical shape, and
the member is disposed in an orientation such that the first cross section is along the first direction of the frac plug and that the second cross section is along the second direction of the frac plug.

9. The frac plug according to claim 1, wherein the member is at least one member of a mandrel, a cone, a slip, or a bottom.

10. The frac plug according to claim 9, wherein the member has a minimum thickness in a range from 1.5 to 45 mm.

11. A method for manufacturing a frac plug including a member made of an Mg alloy,
the method comprising: extrusion-molding the Mg alloy; and cutting the extrusion-molded Mg alloy,
wherein the member constituting the frac plug has a dual phase structure including: a first phase, which is a base phase; and a second phase present in the first phase, and
in the dual phase structure, the second phase is distributed in a substantially stripe shape in the first phase in a first cross section orthogonal to a second direction of the frac plug, and is distributed in a substantially net shape in the first phase in a second cross section orthogonal to a first direction of the frac plug.

12. A method for sealing a well by using a frac plug including a member made of an Mg alloy,
the method comprising:
inserting the frac plug until the frac plug reaches a bottom of a well, installing the frac plug in the well, and completing sealing; and
decreasing a thickness of a cross section of the member constituting the frac plug by a fluid existing in an environment of the well to release an installation state of the frac plug in the well,
wherein the member constituting the frac plug has a dual phase structure including: a first phase, which is a base phase; and a second phase present in the first phase, and
in the dual phase structure, the second phase is distributed in a substantially stripe shape in the first phase in a first cross section orthogonal to a second direction of the frac plug, and is distributed in a substantially net shape in the first phase in a second cross section orthogonal to a first direction of the frac plug.

* * * * *